July 6, 1926.
R. TREJO M.
1,591,581
SCOOTER
Filed Oct. 5, 1925    2 Sheets-Sheet 1
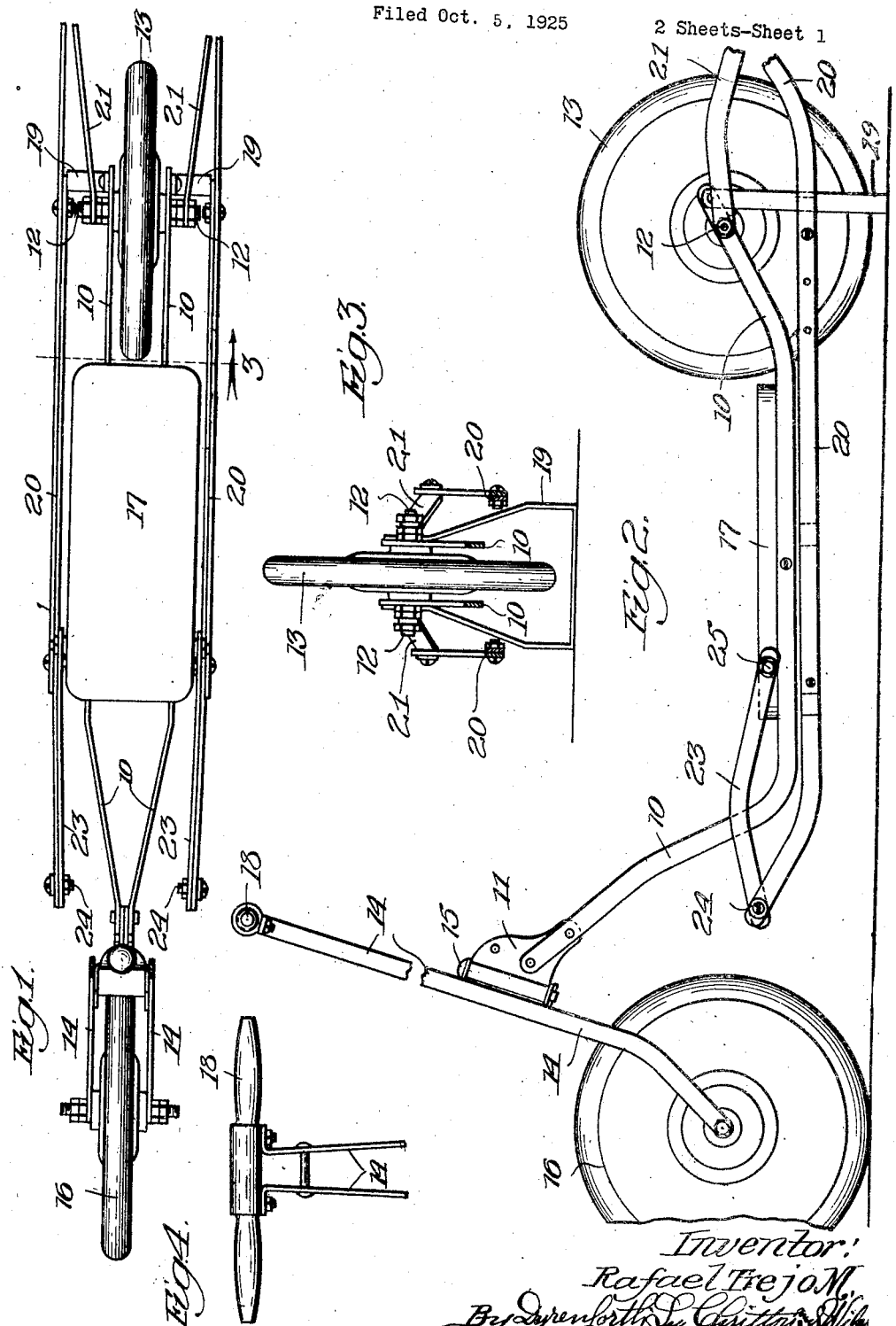
Inventor:
Rafael Trejo M.

July 6, 1926. 1,591,581
R. TREJO M.
SCOOTER
Filed Oct. 5, 1925 2 Sheets-Sheet 2
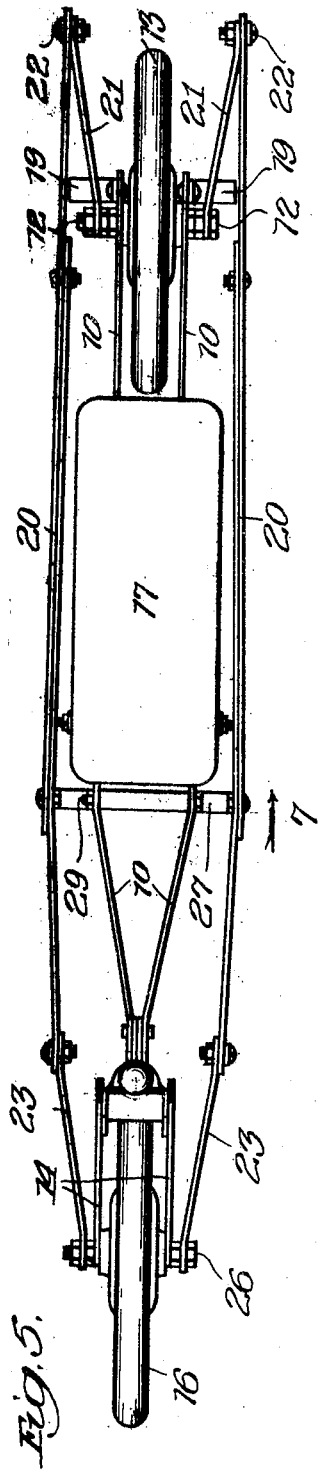
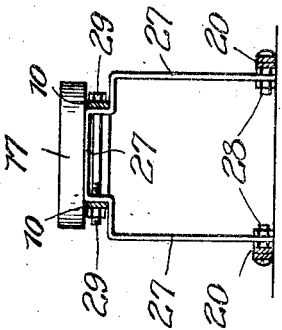
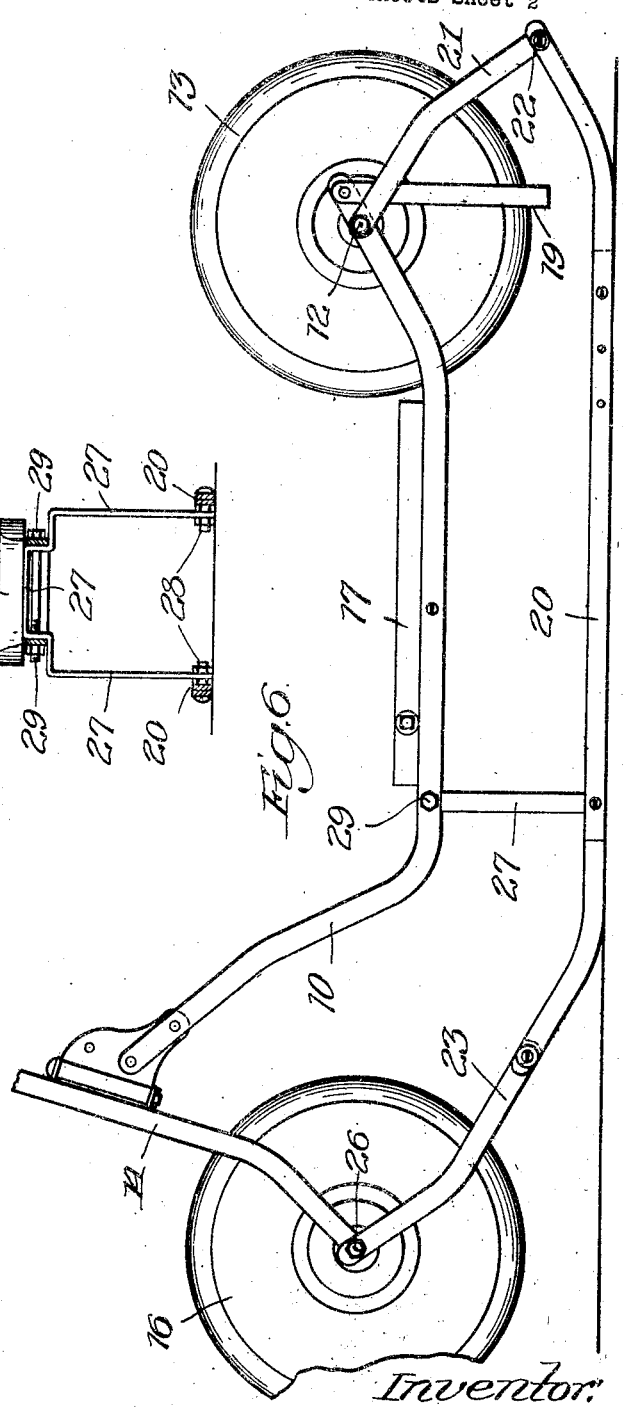
Inventor:
Rafael Trejo M.

Patented July 6, 1926.

1,591,581

UNITED STATES PATENT OFFICE.

RAFAEL TREJO M., OF CHICAGO, ILLINOIS.

SCOOTER.

Application filed October 5, 1925. Serial No. 60,559.

This invention relates to scooters and similar forms of toy vehicles which are propelled by a child resting one foot on the vehicle while the other rests on the ground to propel the vehicle along. The object of this invention is to provide a vehicle of this character which can readily be changed from a wheeled scooter for operation on pavements and the like to a device having runners by which it may be slid upon snowy or icy surfaces.

The invention is fully described in the following specification and shown in the accompanying drawings, in which:—

Figure 1 is a top plan view of the device when used as a wheeled scooter;

Fig. 2 is a side elevation of the same;

Fig. 3 is a vertical section on the line 3 of Fig. 1;

Fig. 4 is a front elevation of the steering handle;

Fig. 5 is a top plan view of the device shown in Fig. 1 with the runners lowered so as to slide on ice or snow;

Fig. 6 is a side elevation of the same; and

Fig. 7 is a vertical section on the line 7 of Fig. 5.

The embodiment illustrated comprises a main frame consisting of spaced bent iron bars 10 which are secured at their forward end to a plate 11 and at their rear ends are connected by a bolt 12 on which is journalled a wheel 13 in a well known manner. A front fork 14 is pivotally secured to the plate 11 by means of a pin 15 and has a front steering wheel 16 journalled therein. A platform 17 is carried by the members 10 upon which the operator stands with one foot while the other serves to propel the scooter, steering being done by means of the handle 18. A stand 19 is pivotally mounted on the rear ends of the members 10 and, when moved beneath the wheel 13 serves as a means for supporting the scooter.

Runners 20 are carried at the sides of the frame members 10 and are pivotally connected at their rear ends to links 21 by means of pins 22 and at their forward ends to links 23 by means of pins 24. The free ends of the links 23 are secured to the platform 17 by means of screws or bolts 25 while the runners are held up in the position shown in Fig. 2, while the device is being used as a wheeled scooter.

When it is desired to use it on ice or snow, the screws or bolts 25 are removed and the forward links 23 swung forward, the platform 17 being simultaneously raised and the runners 20 lowered to the position shown in Fig. 6, when the holes in the free ends of the links 23 may be placed over the ends of the bolt 26 which passes through the front forks 14. The rear links 21 swing down to permit the runners 20 to assume this new position. At the same time a U-shaped supporting member 27 which is pivotally connected to the runners 20 by means of bolts 28 is swung up until the reduced central portion 27ª lies between the frame members 10 when a bolt 29 is passed through the supporting member 27 and the frame members 10 to secure them together.

This arrangement permits the front steering fork 14 to be turned somewhat so as to bend or warp the runners 20 so that they may be steered.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:—

1. In a scooter, a frame, a wheel journalled in the rear, a steerable wheel in front, said frame having side members adapted to be held in a raised position and to be lowered below the level of said wheels so as to act as runners, the forward ends of said runners being connected to the steering mechanism for steering the scooter when used as a sled.

2. In a scooter, a frame, a wheel journalled in the rear, a front fork hingedly connected to said frame, a wheel journalled therein, runners pivotally connected to the frame so as to lie beneath the frame while the scooter operates as a wheeled vehicle and to be lowered when it is to be used as a sled, and hinged links connecting the forward ends of the runners to the frame during the time the vehicle is used as a wheeled scooter and to the front fork when used as a sled.

3. In a scooter, a frame, a wheel journalled in the rear, a front fork hingedly connected to said frame, a wheel journalled therein, runners pivotally connected to the frame so as to lie beneath the frame while the scooter operates as a wheeled vehicle and to be lowered when it is to be used as a sled, hinged links connecting the forward ends of the runners to the frame during the time the vehicle is used as a wheeled scooter and to the front fork when used as a sled, and a brace extending from said runners to said frame when used as a sled.

RAFAEL TREJO M.